(12) United States Patent
Xu

(10) Patent No.: US 7,697,254 B2
(45) Date of Patent: Apr. 13, 2010

(54) POWER SUPPLY PROTECTING CIRCUIT

(75) Inventor: Fa-Qing Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 97 days.

(21) Appl. No.: 11/965,764

(22) Filed: Dec. 28, 2007

(65) Prior Publication Data

US 2009/0059458 A1 Mar. 5, 2009

(30) Foreign Application Priority Data

Aug. 29, 2007 (CN) .................. 2007 1 0201510

(51) Int. Cl.
*H02H 7/09* (2006.01)
(52) U.S. Cl. ........................................ 361/194; 361/33

(58) Field of Classification Search .................. 361/33, 361/194, 196
See application file for complete search history.

(56) References Cited

U.S. PATENT DOCUMENTS 4,040,117 A * 8/1977 Houser ..................... 361/33
4,101,878 A * 7/1978 Shimizu et al. ............ 307/140
7,031,132 B1 * 4/2006 Mitchell .................... 361/103

* cited by examiner

*Primary Examiner*—Danny Nguyen
(74) *Attorney, Agent, or Firm*—Frank R. Niranjan

(57) ABSTRACT

A power supply protecting circuit configured to protect an electronic device includes a normally open switch, a voltage dropping circuit, a first rectifier, and a relay having a coil and switch. A power terminal of the electronic device is connected to a power terminal of a power supply, the other power terminal of the electronic device is connected to the other power terminal of the power supply via the normally open switch. The power terminal of the electronic device is connected to the other power terminal of the electronic device via the voltage dropping circuit, the first rectifier, and the coil of the relay in turn. The switch of the relay is connected in parallel to the normally open switch.

14 Claims, 1 Drawing Sheet

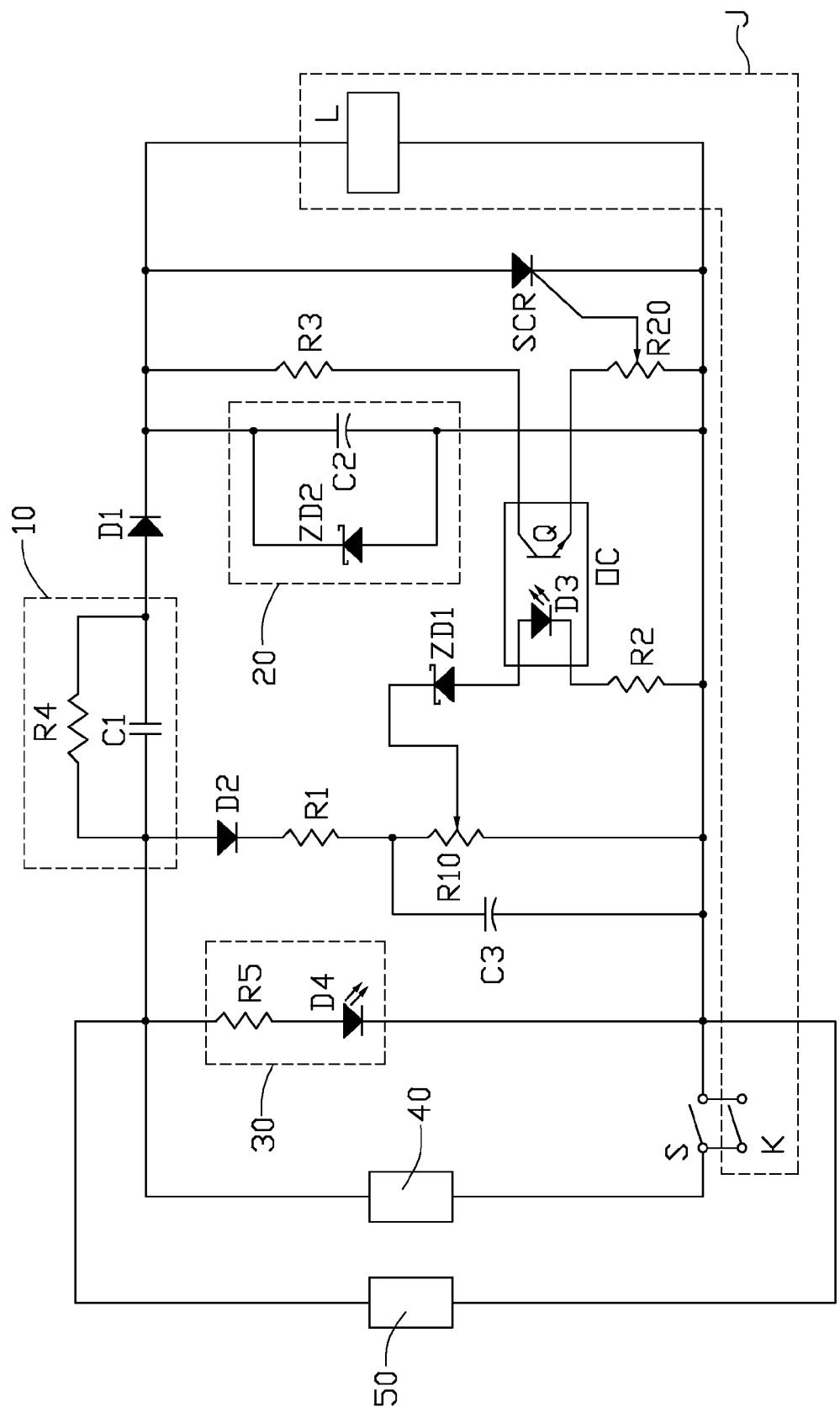

POWER SUPPLY PROTECTING CIRCUIT

BACKGROUND

1. Field of the Invention

The present invention relates to protecting circuits, and particularly to a power supply protecting circuit.

2. Description of Related Art

Power supplies in many regions of the world may be unstable, which may damage electronic devices. Moreover, some users do not turn off the electronic devices during a power outage. Thereby, these electronic devices will automatically startup when power is restored, which not only wastes electricity, but also may cause damage.

What is needed is to provide a power supply protecting circuit which can protect electronic devices.

SUMMARY

An embodiment of a power supply protecting circuit configured to protect an electronic device includes a normally open switch, a voltage dropping circuit, a first rectifier, and a relay having a coil and switch. A power terminal of the electronic device is connected to a power terminal of a power supply, the other power terminal of the electronic device is connected to the other power terminal of the power supply via the normally open switch. The power terminal of the electronic device is connected to the other power terminal of the electronic device via the voltage dropping circuit, the first rectifier, and the coil of the relay in turn. The switch of the relay is connected in parallel to the normally open switch.

Other advantages and novel features of the present invention will become more apparent from the following detailed description of an embodiment when taken in conjunction with the accompanying drawing, in which:

BRIEF DESCRIPTION OF THE DRAWING

The drawing is a circuit diagram of a power supply protecting circuit in accordance with an embodiment of the present invention.

DETAILED DESCRIPTION

Referring to the drawing, a power supply protecting circuit in accordance with an embodiment of the present invention is configured to protect an electronic device 50. The power supply protecting circuit includes a voltage dropping circuit 10 configured for dropping voltage, a filter circuit 20, a power indicator circuit 30, a first rectifier such as a diode D1, a second rectifier such as a diode D2, a first variable resistor R10, a second variable resistor R20, a first resistor R1, a second resistor R2, a third resistor R3, a filter capacitor C3, a first voltage regulator ZD1, a photocoupler OC having a light-emitting diode (LED) D3 and a phototransistor Q, a thyristor SCR, a relay J having a coil L and a switch K, and a normally open switch S.

The voltage dropping circuit 10 includes a first capacitor C1 and a voltage dropping resistor R4 connected in parallel to the first capacitor C1. The filter circuit 20 includes a second voltage regulator ZD2 and a second capacitor C2 connected in parallel to the second voltage regulator ZD2. The power indicator circuit 30 includes a current-limiting resistor R5 and an LED D4.

A power terminal of the electronic device 50 is connected to the anode of the LED D4 via the resistor R5. The other power terminal of the electronic device 50 is connected to the cathode of the LED D4. A power terminal of an external power supply 40 is connected to the power terminal of the electronic device 50. The other terminal of the external power supply 40 is connected to the other power terminal of the electronic device 50 via the normally open switch S. The switch K is connected in parallel to the normally open switch S. The power terminal of the external power supply 40 is connected to the anode of the diode D1 via the first capacitor C1. The cathode of the diode D1 is connected to a power terminal of the coil L. The other power terminal of the coil L is connected to the cathode of the LED D4.

The power terminal of the external power supply 40 is connected to the anode of the diode D2. The cathode of the diode D2 is connected to a terminal of the first variable resistor R10 via the first resistor R1. The other terminal of the first variable resistor R10 is connected to the cathode of the LED D4. The filter capacitor C3 is connected in parallel to the first variable resistor R10. The adjusting terminal of the first variable resistor R10 is connected to the cathode of the first voltage regulator ZD1. The anode of the first voltage regulator ZD1 is connected to the anode of the LED D3. The cathode of LED D3 is connected to the cathode of the LED D4 via the second resistor R2. The cathode of the diode D1 is connected to the cathode of the second voltage regulator ZD2. The anode of the second voltage regulator ZD2 is connected to the cathode of the LED D4. The collector of the phototransistor Q is connected to the cathode of the diode D1 via the third resistor R3. The emitter of the phototransistor Q is connected to a terminal of the second variable resistor R20. The other terminal of the second variable resistor R20 is connected to the cathode of the LED D4. The adjusting terminal of the second variable resistor R20 is connected to the gate of the thyristor SCR. The anode of the thyristor SCR is connected to the cathode of the diode D1. The cathode of the thyristor SCR is connected to the cathode of the LED D4.

When a user needs to use the electronic device 50, the normally open switch S is pressed. At the time the normally open switch S is closed, the external power supply 40 supplies power to the coil L of the relay j via the voltage dropping circuit 10, the diode D1, and the filter circuit 20. Then the switch K is turned on, thereby the electronic device 50 starts to work, and the normally open switch S automatically returns to being open.

If the external power supply 40 suddenly stops working (e.g. during a power outage), the coil L of the relay J will control the switch K to be turned off. When power is restored (power supply 40 starts working again), because the normally open switch S is open, the electronic device 50 will not automatically start, but must be manually started by the user closing the switch S again. Therefore, the power supply protecting circuit can protect the electronic device 50 from automatic startup when power is restored.

Moreover, if voltage of the external power supply 40 is greater than a rated voltage of the electronic device 50, breakdown voltage of the first voltage regulator ZD1 will be reached causing the first voltage regulator ZD1 to conduct thereby activating the photocoupler OC, turning on the thyristor SCR, thereby the coil L of the relay j cannot work and the switch K is turned off. Then power from the external power supply 40 is cut off. Further, the power indicator circuit 30 can indicate the power status of the connection between the external power supply 40 and the power supply protecting circuit.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply protecting circuit configured to protect an electronic device comprising:
   a normally open switch, a power terminal of the electronic device connected to a power terminal of a power supply, the other power terminal of the electronic device connected to the other power terminal of the power supply via the normally open switch;
   a voltage dropping circuit;
   a first rectifier;
   a relay having a coil and switch, the power terminal of the electronic device connected to the other power terminal of the electronic device via the voltage dropping circuit, the first rectifier, and the coil of the relay in turn, the switch of the relay connected in parallel to the normally open switch;
   a second rectifier;
   a first variable resistor, the anode of the second rectifier connected to the power terminal of the electronic device, the cathode of the second rectifier connected to the other power terminal of the electronic device via the first variable resistor;
   a filter circuit;
   a first voltage regulator;
   a photocoupler having a first light-emitting diode (LED) and a phototransistor;
   a second variable resistor; and
   a thyristor, the adjusting terminal of the first variable resistor connected to the cathode of the first voltage regulator, the anode of the first voltage regulator connected to the anode of the first LED of the photocoupler, the cathode of the first LED connected to the other power terminal of the electronic device, the collector of the phototransistor of the photocoupler connected to the cathode of the first rectifier, the emitter of the phototransistor connected to the other power terminal of the electronic device via the second variable resistor, the adjusting terminal of the second variable resistor connected to the gate of the thyristor, the anode of the thyristor connected to the cathode of the first rectifier, the cathode of the thyristor connected to the cathode of the other power terminal of the electronic device.

2. The power supply protecting circuit as claimed in claim 1, further comprising a power indicator circuit having a current-limiting resistor and an second LED, the anode of the second LED connected to the power terminal of the electronic device via the current-limiting resistor, the cathode of the second LED connected to the other power terminal of the electronic device.

3. The power supply protecting circuit as claimed in claim 1, wherein the voltage dropping circuit comprises a first capacitor and a voltage dropping resistor connected in parallel to the first capacitor, the first capacitor is connected between the power terminal of the electronic device and the anode of the first rectifier.

4. The power supply protecting circuit as claimed in claim 1, wherein the filter circuit comprises a second voltage regulator and a second capacitor connected in parallel to the second voltage regulator, the cathode of the second voltage regulator is connected to the cathode of the first rectifier, the anode of the second voltage regulator is connected to the other power terminal of the electronic device.

5. The power supply protecting circuit as claimed in claim 1, wherein the first and second rectifiers are diodes.

6. The power supply protecting circuit as claimed in claim 1, wherein a filter capacitor is connected in parallel to the first variable resistor.

7. The power supply protecting circuit as claimed in claim 1, wherein a resistor is connected between the cathode of the second rectifier and the first variable resistor.

8. The power supply protecting circuit as claimed in claim 1, wherein a resistor is connected between the cathode of the LED of the photocoupler and the other power terminal of the electronic device.

9. The power supply protecting circuit as claimed in claim 1, wherein a resistor is connected between the cathode of the first rectifier and the collector of the phototransistor of the photocoupler.

10. A power supply protecting circuit configured to protect an electronic device comprising:
    a normally open switch, a power terminal of the electronic device connected to a power terminal of a power supply, the other power terminal of the electronic device connected to the other power terminal of the power supply via the normally open switch;
    a voltage dropping circuit;
    a first rectifier; and
    a relay having a coil and a switch, the power terminal of the power supply connected to the other power terminal of the power supply via the voltage dropping circuit, the first rectifier, the coil of the relay, and the normally open switch in turn, the switch of the relay connected in parallel to the normally open switch.

11. The power supply protecting circuit as claimed in claim 10, further comprising a power indicator circuit having a current-limiting resistor and a LED, the anode of the LED connected to the power terminal of the electronic device via the current-limiting resistor, the cathode of the LED connected to the other power terminal of the electronic device.

12. The power supply protecting circuit as claimed in claim 10, wherein the voltage dropping circuit comprises a first capacitor and a voltage dropping resistor connected in parallel to the first capacitor, the first capacitor is connected between the power terminal of the electronic device and the anode of the first rectifier.

13. The power supply protecting circuit as claimed in claim 10, further comprising a filter circuit having a second voltage regulator and a second capacitor connected in parallel to the second voltage regulator, the cathode of the second voltage regulator is connected to the cathode of the first rectifier, the anode of the second voltage regulator is connected to the other power terminal of the electronic device.

14. The power apply protecting circuit claimed in claim 10, wherein the first rectifier is a diode.

* * * * *